3,011,778
ALIGHTING GEAR SHOCK STRUT FOR AIRCRAFT
Robert T. Yntema, Newtown Square, Pa., assignor, by mesne assignments, to Boeing Airplane Company, Seattle, Wash., a corporation of Delaware
Filed July 1, 1959, Ser. No. 824,372
5 Claims. (Cl. 267—64)

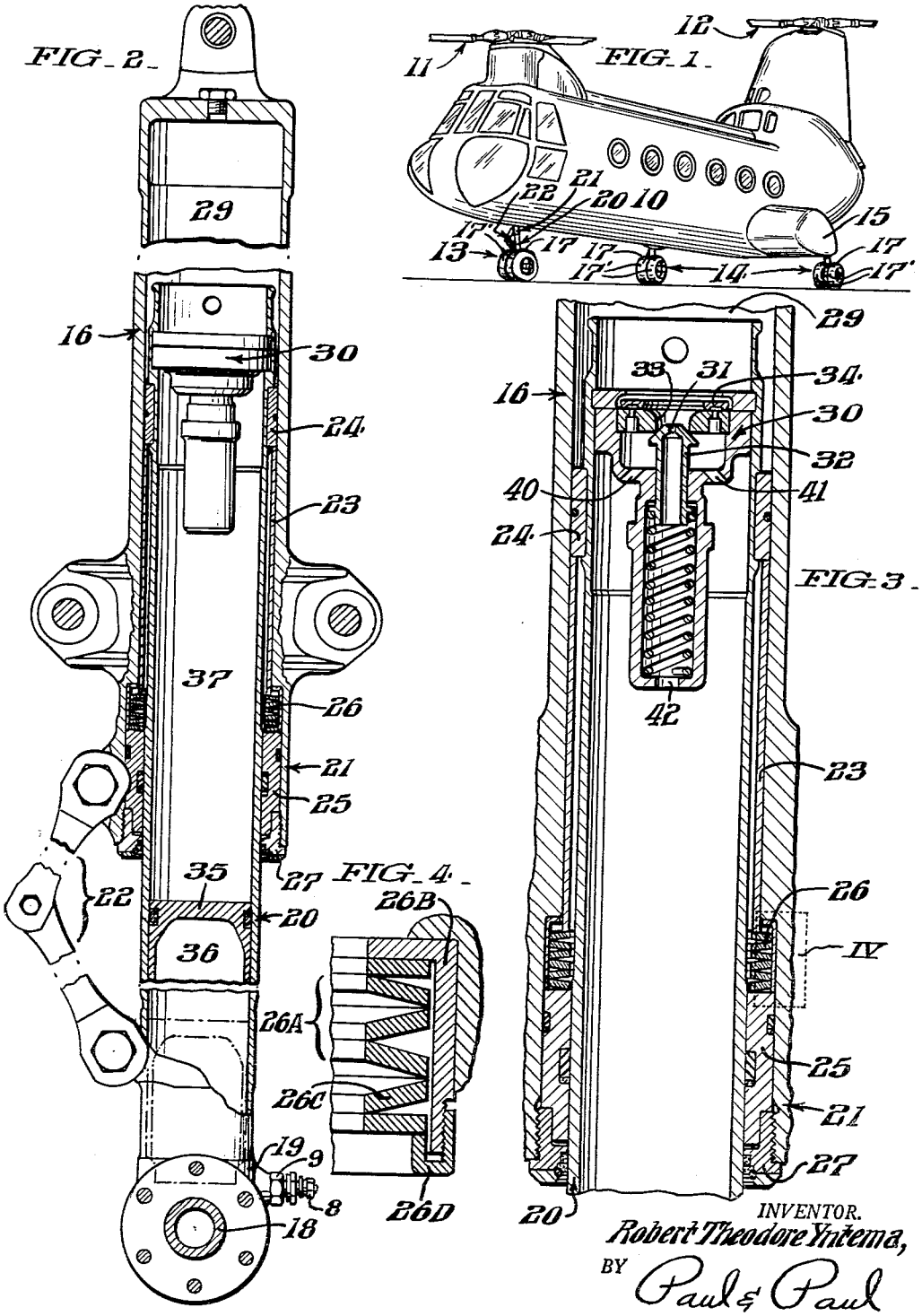

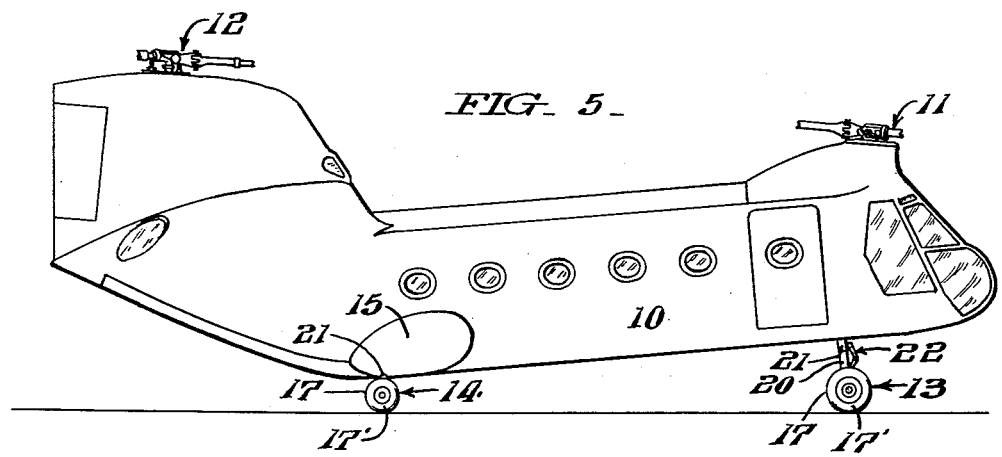
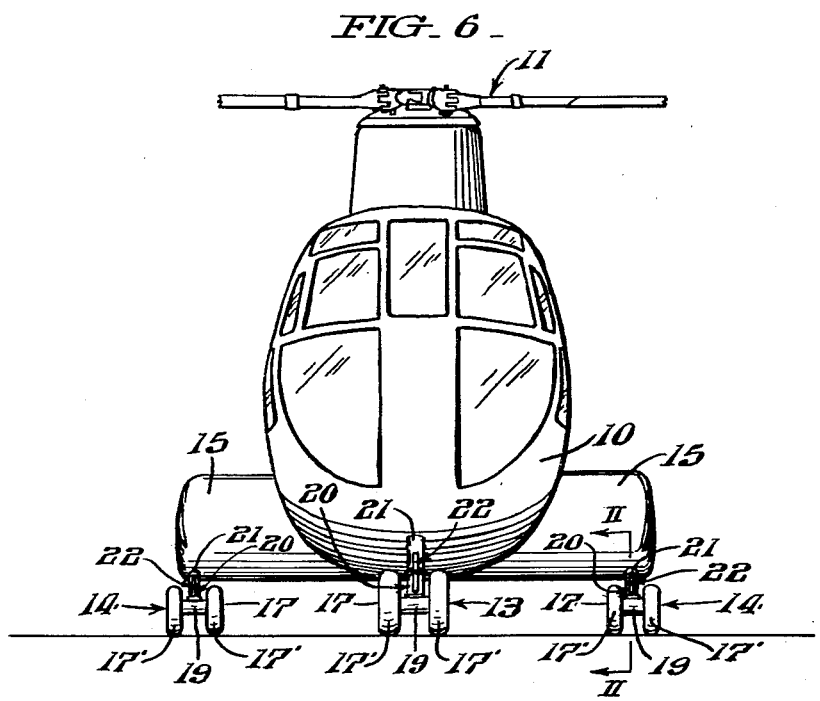

The present invention relates to aircraft alighting gear and particularly to an improved type of alighting gear shock strut which provides damping for ground resonance under all operating conditions as well as absorbing the normal landing shock.

The principal object of this invention is to incorporate into alighting gear shock strut, capable of absorbing the vertical shock loads encountered during landing operations of VTOL (vertical take-off and landing) type aircraft, a sufficient vibrational damping action to avoid ground resonance when the shock strut is almost fully extended and the ground contacting elements of the alighting gear are making relatively light contact with the ground.

There exists in all helicopters an inherent tendency towards a condition of mechanical instability commonly called ground resonance. Under certain conditions, the vast flywheel kinetic energy of the rotor induces an accelerating and divergent oscillation of the fuselage on its alighting gear. These oscillations have been known to become so violent as to damage or destroy the aircraft. This unstable condition is brought on in helicopters by blade depatterning, that is, the condition wherein the individual blades of the rotor system oscillate about their lead-lag hinges in such a manner that the combined center of gravity of the individual blades in the rotor system does not coincide with the rotational axis of the rotor shaft, but whirls about an eccentric locus relative to said shaft axis. In ground resonance this eccentric motion of the center of gravity of the rotor system combines with the natural mode motion of the helicoper on its alighting gear in such a phase relation that their combined effects produce an oscillating motion that becomes divergent.

With conventional helicopters, two regions of instability are generally considered. The first is a predominantly lateral oscillation of the helicopter about a longitudinal axis accompanied by rotor blade depatterning, the frequency of which is less than the rotational r.p.m. of the rotor system, usually near 100 cycles per minute; the second is predominantly a roll motion of the helicopter about an axis near the aircraft's center of gravity, also accompanied by blade depatterning, and usually occurs at a frequency close to or in the normal rotor operating r.p.m. range. It is this roll mode which test experience has shown to be of major concern in dealing with the problem of ground resonance.

In practice two possible means of dealing with the ground resonance problem are available to the designer. Either the unstable regions must be removed from the operating speed range by suitable selection of the significant spring rates and/or inertias, or the divergent oscillations must be controlled by damping. Since the significant spring rate of the tire and shock strut which govern the location of the unstable regions vary with load on the gear, the former method usually involves a substantial weight penalty if instability is to be avoided under all possible landing and take-off conditions. Thus efforts usually are made to avoid the instability regions only in the more normal landing and take-off conditions and damping is relied upon for the less likely conditions. Effective damping for ground resonance has been found to be a product of rotor hub damping, provided by blade lag dampers, and oleo damping provided by the landing gear. Thus, if either of these quantities approaches zero, the effective damping for ground resonance also approaches zero. It is with this problem, namely, the assurance that oleo damping never becomes zero, that the present invention is concerned.

Depending on the rotor blade properties, the instability region is normally located at a frequency some 10 to 60% above a "reference frequency." This reference frequency is merely one of the two coupled roll-lateral natural frequencies of the helicopter mass and inertia on its alighting gear shock strut and tire. The oscillation frequencies which are paramount in setting the natural reference frequencies are dependent upon the shock strut vertical spring rate which varies widely and is dependent upon the degree of extension, the shock strut lateral spring rate, the vertical spring rate of the tire and the lateral spring rate of the tire. As is well known, "spring rate" refers to the relationship between load impressed and spring deflection. The larger the deflection, the lower the spring rate.

For the important roll mode, these spring rates can be thought of as forming an equivalent roll spring rate about a longitudinal axis of the helicopter passing through the center of gravity.

The vertical spring rate of the shock strut and the radial spring rate of the tire, combine in series to form an equivalent vertical spring rate $K_V$ which is lower than either of these spring rates taken singly. The combined spring rate of the left alighting gear and its equal counterpart on the right alighting gear acts through the width of the wheel base ($2e$) to form an effective rotational spring of rate $2K_Ve^2$ about the center of gravity. Similarly the lateral spring rate of the tire combines in series with the shock strut lateral bending rate to form an equivalent lateral spring rate $K_L$. The rate $K_L$ acts about a vertical arm H reaching from the ground contact point up to the center of gravity to form a parallel rotational spring of rate $2K_LH^2$. The total rotational spring, $2K_Ve^2+2K_LH^2$, together with the roll inertia of the helicopter essentially determines the roll mode reference frequency.

At the 0% airborne, the shock struts and tires are heavily loaded and their spring rates quite high so that the oscillation frequency is relatively high and in a safe range above rotor speed. At about the 50% airborne condition, the radial spring rate of the tire decreases slightly, the vertical spring rate of the shock strut decreases considerably, and the combined reference frequency is lowered to a less desirable value. At about the 75% airborne condition, the shock strut is almost fully extended and has a very low vertical spring rate; therefore, the lateral spring rate of the tires coupled with the lateral bending rate of the shock strut must provide the entire spring restraint. Under these conditions, when oscillation does occur, the damping force obtained through motion of the shock strut piston relative to the cylinder together with the action of the rotor blade's lead-lag dampers should be sufficient to prevent the growth of an instability. However, the air-oil type oleo strut mechanisms used in alighting gear for aircraft customarily include air or other gas under pressure to avoid strut bottoming during taxiing; this pressure also extends the oleo as the load is removed. When the vertical load on the strut is small, i.e. at touchdown or just prior to leaving the ground, this air pressure bottoms the strut in the extended position and sets up a condition requiring an oscillatory force of considerable magnitude to initiate strut compression and oil flow damping.

When the presently known VTOL aircraft with conventional alighting gear are at a low percent airborne, i.e. with most of the aircraft's weight still on the alighting gear, the shock strut and tires contribute to a desirable high reference frequency and provide substantial damping through oleo oil flow action. However, when the aircraft is at a high percent airborne, i.e. 75% or more airborne, the alighting gear shock struts are completely extended and bottomed under the force of the internal air pressure (preload) and the shock strut and tire combination contribute very little damping to oscillations of the VTOL aircraft on its alighting gear since oscillatory forces in excess of the steady preload forces are required to actuate the damping mechanism. In such cases there is presented a danger that ground resonance will develop and reach large amplitudes before the high strut forces required to unseat the strut are developed.

The object of the present invention is to provide an improved alighting gear for VTOL type aircraft having normal shock absorbing characteristics but incorporating means for providing sufficient damping at high percents airborne to check the growth of any unstable oscillation of the aircraft on its alighting gear.

Other objects and advantages of the invention will become apparent from the following description and accompanying drawings in which:

FIG. 1 is a front perspective view of a vertical take-off and landing type aircraft embodying the present invention;

FIG. 2 is an enlarged detailed sectional view as indicated by the lines and arrows II—II on the alighting gear shown in FIG. 6;

FIG. 3 is an enlarged detailed sectional view of a part of the telescopic compression mechanism of the alighting gear shock strut shown in FIG. 2;

FIG. 4 is an enlarged detailed sectional view in modified form of the structure indicated by the dotted lines marked IV in FIG. 3;

FIG. 5 is a side elevation view of the aircraft of FIG. 1;

FIG. 6 is a front elevation view of the aircraft shown in FIG. 1.

FIG. 1 is a perspective view of a tandem rotor helicopter comprising a fuselage 10 and rotors 11 and 12 mounted at either end of the fuselage and driven by shaft means and a power plant (not shown) contained within the aft upper section of the fuselage. The helicopter alighting gear consists of two main gear assemblies 14 attached to the outboard sections of the stub wings 15 and a castering nose gear assembly 13 located in the fuselage nose section directly under the forward rotor 11. The main gear consists of a single oleo strut on each stub wing equipped with twin independently rotating wheels 17 carrying tires 17'. The nose gear consists of a single oleo strut located on the longitudinal center line in the nose section, equipped with twin co-rotative wheels 17 carrying tires 17'.

The main alighting gear is composed of two major assemblies, namely, oleo strut and wheel. The oleo is an air-oil type shock strut utilizing the usual air preload which is introduced through the air valve 8 mounted in the pressure fitting 9. The wheel assembly consists of a wheel, a tire, a tube, and a brake assembly plus the necessary bearings, seals, and axle to attach the wheel to the lower end of the oleo strut.

Shock strut 16, shown in FIG. 2, is rigidly connected to an airframe member (not shown) in the outboard portion of the stub wing 15. The wheels 17 are rotatably mounted on axle member 18 which is rigidly mounted to the terminal fitting 19 at the lower end of shock strut 16. The lower inner piston assembly 20 of the telescoping shock strut 16 is rotatably restrained with respect to the upper cylinder assembly 21 by the torque link scissors assembly 22. Located in the upper end of piston assembly 20 is the piston head 30. Interposed between the piston assembly 20 and the upper cylinder assembly 21 is a sleeve 23 which interacts between the upper piston bearing 24 attached to the piston assembly 20 and the lower cylinder bearing 25 attached to the lower end of cylinder assembly 21. At its lower end the sleeve 23 bears on the recoil spring assembly 26. As the spring 26 is compressed it limits the extension of the landing gear. This can be more clearly seen in the enlarged detail view of FIG. 3 wherein the lower cylinder bearing 25, having both an inner and an outer seal, is rigidly held in the lower end of cylinder assembly 21 by a bearing retaining nut 27 also having an inner seal and scraper ring. Also held in position by said retaining nut 27 is the bottoming spring 26. While this spring as shown is composed of dished washers it is anticipated that future designs may incorporate air or liquid springs or other types of mechanical springs, excluding, however, a single cylindrical helical spring which would be totally unsatisfactory in view of the relatively large diameter of the cylindrical piston assembly 20 which such a spring would be required to embrace. This would necessitate that the helical spring be of relatively large cylindrical diameter and in order to take the heavy load required to be taken such spring would have to be made of relatively thick spring rod stock. Such thick spring rod stock would, however, be unable to deflect sufficiently under small oscillatory loads. As shown in modified form in FIG. 4, the spring assembly 26A is comprised of the spring guide 26B, the flat spring 26C formed by the dished washers, and the threaded cap 26D. Compression of the spring 26A is adjustable by changing the position of threaded cap 26D.

As shown in FIG. 2 the alighting gear is in the fully extended position corresponding to ground contact of the aircraft under a very high (substantially 100%) airborne condition. As the aircraft becomes airborne the alighting gear shock strut is moved to this extended position by the combined force of gravity and the pre-load cylinder pressure, until the upper piston bearing 24 attached to piston assembly 20, in bearing against the sleeve 23, is balanced by the compressive force of the bottoming spring assembly 26. This compressive force is selected so that spring 26 is significantly compressed but not bottomed by this pre-load force. In other words, spring 26 is characterized by having the ability to support a relatively heavy load and yet be displaced an appreciable distance in response to relatively small forces. Spring 26 may also be said to be characterized by a low substantially linear spring rate.

During the compression stroke of the shock strut the fluid metering unit 30 meters the compressed fluid from the upper chamber 29 through the metering orifice 31 provided in said unit 30 to the lower chamber 37 by way of the opening 42. The floating piston 35 separates the compressed air 36 in the lower section of the piston assembly shock strut 20 from the fluid 37. Under small motions of slide 24 and piston the oil passes through the small orifice 31 and opening 42. With large rapid motions, such as encountered in a hard landing impact, the poppet valve 32 is forced open and oil passes through the large orifice 33 and openings 40, 41. During extension, oil under pressure from the floating piston 35, passes up through opening 42 and the small orifice 31 in the poppet valve 32 if small, relatively slow motions are involved; if large, rapid changes in external load occur, such as in a jump takeoff, the check valve 34 is forced open and the oil passes up through openings 40, 41 and through the open check valve 34 and the shock strut extends rapidly. However, full extension of the shock strut is prevented by the action of spring 26 which acts as a "spring spacer." Near the end of the oleo piston stroke the spring 26 is compressed until the spring force equals the combined force of gravity and the pre-load air pressure. When this position is reached the floating piston 35 assumes the position shown in solid lines in FIG. 2. The position of floating piston 35 at a condition of full load on the alighting gear is shown in dot and dash lines in FIG. 2. Spring 26 is so designed that when the gravity plus pre-load force and the spring compression force are equal to the oleo piston will still be far enough from the end of its stroke that it will not bottom under small random shock or oscillatory inputs. At the same time the spring 26 is so selected as to give a significant movement in compression so that a corresponding travel upward of sleeve 23 and slide 24 will be available on application of light loads requiring damping to prevent ground resonance. It is important to note that the characteristics of the spring 26 are selected so that the force generated by gravity plus the pre-load is balanced by the compressed spring 26 without bottoming. Consequently, the force required to move the piston assembly 20 a sufficient amount to generate a damping action through the flow of fluid through orifice 31 is very much less than the usual pre-load type. With the load supported on the compressed spring 26 there is required a much smaller force to produce motion of the piston than would be the case if the lower end of sleeve 23 was bottomed on the upper surface of the lower cylinder bearing 25. Since oil flow damping becomes available only when the piston is caused to move, it will be seen that a damping force is made available in response to loads which are substantially less than the usual impact loads. At the same time the spring 26 is made short enough so that the energy absorption characteristics of the shock strut at heavy loads are not adversely affected to any substantial extent. There is thus available a damping action throughout the range of the oleo piston travel regardless of the load, and consequently a damping action is available for the prevention of ground resonance throughout the range from 0 to 100% airborne.

Although shown and described in what is believed to be the most practical and preferred embodiment, it is apparent that departures from the specific apparatus shown will suggest themselves to those skilled in the art and may be made without departing from the spirit and scope of the invention. While the alighting gear of the present invention is shown embodied in a helicopter, it is to be noted that although shown and described with reference to such aircraft, the alighting gear of the present invention is not so limited, but is adaptable to fixed wing as well as to other VTOL type aircraft. I therefore do not wish to restrict myself to the particular form of construction illustrated and described, but desire to avail myself of all modifications that may fall within the scope of the appended claims.

Having thus described my invention, I claim:

1. In an aircraft alighting gear comprising in combination a wheel assembly and an oleo strut assembly having a gas-oil telescoping shock strut, a lower cylinder, an upper cylinder, a lower cylinder bearing and an upper cylinder bearing interposed between said lower and upper cylinders, a piston in said lower cylinder, a second piston in said upper cylinder, said second piston having an always-open metering passage therethrough and normally-closed valve means openable in response only to large force movement of said second piston in either direction for providing larger passage therethrough, means for supplying gas under pressure to said lower cylinder, a sleeve interposed between said upper cylinder bearing and said lower cylinder bearing and movably positioned between said lower cylinder and said upper cylinder, a spring consisting of a plurality of dished washers interposed between the lower end of said sleeve and the lower cylinder bearing, said spring being characterized by a low substantially linear spring rate, the compressive force of said spring being such that said spring is not bottomed by the combined effect of said gas pressure and the gravity force of the wheel assembly when the alighting gear is in its extended position, whereby the load generated by said gas pressure and the gravity force of said wheel assembly is carried on said spring when the alighting gear is in its extended position.

2. The invention of claim 1 further characterized by a spring guide and a threaded cap operatively engaging said spring and said guide whereby the compression of said spring is adjustable by changing the position of said cap.

3. A damped telescopic shock strut for helicopters and other vertical take-off and landing type of aircraft which are susceptible to a peculiar form of vibration known as ground resonance, said strut comprising: a cylinder closed at one end; a hollow piston disposed for reciprocation in said cylinder and having one end projecting exteriorly of said cylinder; means in the head of said piston for controlling flow of fluid between the cylinder chamber at said one end and the interior chamber of said hollow piston, said means comprising an always-open metering orifice for permitting relatively slow flow of fluid in either direction, and first and second normally-closed valve means openable only in response to high pressure differentials in one direction or the other, respectively, between the cylinder chamber and the chamber in the interior of said hollow piston for permitting more rapid flow of fluid in either direction at a rate corresponding to the magnitude of the high pressure differential; a sleeve cooperating with said piston and with said cylinder; abutment means on said piston and on said cylinder adapted to engage said sleeve for limiting extension of said shock strut; spring means interposed between said sleeve and said abutment means to permit relatively large oscillatory motion of said cylinder in relation to said piston under very small fluctuations in load, said spring means being other than a single cylindrical helical spring and being characterized by a low substantially linear spring rate a floating piston disposed in said hollow piston; and means for supplying gas under pressure to one side of said floating piston, said compressed gas establishing a pre-load force tending to extend said strut.

4. A damped telescopic shock strut for helicopters and other vertical take-off and landing type of aircraft which are susceptible to a peculiar form of vibration known as ground resonance, said shock strut comprising: a cylinder closed at its upper end; a hollow piston movable within said cylinder and protruding from the lower end of said cylinder; a floating piston free to move within said hollow piston; a fluid in said cylinder and hollow piston above said floating piston; a compressed gas in said hollow piston below said floating piston, said compressed gas establishing a pre-load force tending to extend said strut; a fluid-passage system in the head of said hollow piston comprising an always-open metering orifice, a normally-closed first valve which opens only in response to large-force movement of said hollow piston in a direction tending to contract said strut, and a normally-closed second valve which opens in response to large-force movement of said hollow piston in a direction tending to extend said strut, whereby the flow of said fluid between said cylinder and said hollow piston is solely through said metering orifice unless said force is sufficiently large to open said first or second valves; recoil compression spring means outside said hollow piston wall and inside said cylinder wall, the lower end of said spring means being fixed relative to said cylinder, said spring means being other than a single cylindrical helical spring and being characterized by a low substantially linear spring rate; and means above said spring means, and adapted to be moved downwardly in response to downward movement of said hollow piston relative to said cylinder, for compressing said spring means, the compression force of said spring means being so selected that the combined full gravitational and pre-load forces tending to extend said strut are not sufficient to fully compress said spring means, thereby to allow ready movement of said hollow piston in either direction in response to small vibratory shocks, even in the presence of full gravitational and pre-load forces.

5. A damped telescopic shock strut for helicopters and other vertical take-off and landing type of aircraft which are susceptible to a peculiar form of vibration known as ground resonance, said strut comprising: a cylinder closed at its upper end; a hollow piston movable within said cylinder and protruding from the lower end of said cylinder; a floating piston free to move within said hollow piston, the space in said hollow piston between its head and said floating piston being free of fixed obstructions; a fluid in said cylinder and hollow piston above said floating piston; a compressed gas in said hollow piston below said floating piston, said compressed gas establishing a pre-load force tending to extend said strut; a valve system in the head of said hollow piston, said valve system comprising an always-open metering orifice, a normally-closed first valve which opens only in response to large-force movement of said hollow piston in a direction tending to contract said strut, and a normally-closed second valve which opens only in response to large-force movement of said hollow piston in a direction tending to extend said strut, whereby the flow of said fluid between said cylinder and said hollow piston is solely through said metering orifice except when the said force is sufficiently large to open said first or second valves; compression spring means outside said hollow piston wall and inside said cylinder wall, the lower end of said spring means being held fixed relative to said cylinder near the lower end thereof, said spring means being other than a single cylindrical helical spring and being characterized by the ability to support relatively heavy loads and yet be appreciably displaced in response to relatively small oscillatory forces; and means, including a sleeve surrounding said hollow piston above said spring means and adapted to be moved downwardly in response to downward movement of said hollow piston relative to said cylinder, for compressing said spring means, the compression force of said spring means being so chosen that the combined pre-load and full gravitational forces tending to extend said strut are not sufficient to fully compress said spring means, thereby permitting ready movement of said first piston in either direction in response to the addition of small vibratory shocks, even in the presence of full gravitational and pre-load forces.

References Cited in the file of this patent

UNITED STATES PATENTS

| | | |
|---|---|---|
| 1,460,420 | Joyce | July 3, 1923 |
| 2,146,089 | Onions | Feb. 7, 1939 |
| 2,379,388 | Thornhill | June 26, 1945 |
| 2,476,228 | Thornhill | July 12, 1949 |

FOREIGN PATENTS

| | | |
|---|---|---|
| 976,574 | France | Nov. 1, 1950 |